United States Patent
Nuvvula (10) Patent No.: US 11,252,672 B1
(45) Date of Patent: Feb. 15, 2022

(54) ACCESS POINT RADIO CHANNEL CONFIGURATION USING MULTIPROTOCOL BORDER GATEWAY PROTOCOL

(71) Applicant: Versa Networks, Inc., San Jose, CA (US)

(72) Inventor: Rajesh Kumar Nuvvula, Sunnyvale, CA (US)

(73) Assignee: Versa Networks, Inc., San Jose, CA (US)

( * ) Notice: Subject to any disclaimer, the term of this patent is extended or adjusted under 35 U.S.C. 154(b) by 0 days.

(21) Appl. No.: 17/127,939

(22) Filed: Dec. 18, 2020

(51) Int. Cl.
*H04W 24/10* (2009.01)
*H04W 52/24* (2009.01)
*H04W 72/04* (2009.01)

(52) U.S. Cl.
CPC ......... *H04W 52/241* (2013.01); *H04W 24/10* (2013.01); *H04W 72/0453* (2013.01)

(58) Field of Classification Search
USPC .................................................. 455/522, 69
See application file for complete search history.

(56) References Cited

U.S. PATENT DOCUMENTS

| | | | | |
|---|---|---|---|---|
| 7,532,631 B2 * | 5/2009 | Raszuk | ................... | H04L 45/02 370/401 |
| 7,693,047 B2 * | 4/2010 | Guichard | ................ | H04L 45/54 370/217 |
| 8,027,347 B2 * | 9/2011 | Ould-Brahim | ...... | H04L 12/4625 370/397 |
| 8,117,338 B2 * | 2/2012 | Ould-Brahim | ...... | H04L 12/4641 709/242 |
| 8,532,095 B2 * | 9/2013 | Mammoliti | ......... | H04L 41/0806 370/389 |
| 8,619,791 B2 * | 12/2013 | Ould-Brahim | ...... | H04L 12/4662 370/397 |
| 8,659,639 B2 * | 2/2014 | Baldino | .................... | H04N 7/15 348/14.09 |
| 8,665,887 B2 * | 3/2014 | Ge | ........................ | H04L 45/741 370/401 |
| 8,670,320 B2 * | 3/2014 | Eswaran | ............... | H04L 45/306 370/235 |
| 8,682,087 B2 * | 3/2014 | Tian | ...................... | H04N 13/161 382/232 |
| 8,692,862 B2 * | 4/2014 | N'guessan | ............... | H04N 7/15 348/14.08 |
| 8,730,297 B2 * | 5/2014 | Fornell | .................. | H04N 7/147 348/14.12 |
| 8,761,043 B2 * | 6/2014 | Papp | ....................... | H04L 45/50 370/254 |
| 8,891,450 B2 * | 11/2014 | Bosch | ................... | H04L 45/023 370/328 |

(Continued)

*Primary Examiner* — Hai V Nguyen
(74) *Attorney, Agent, or Firm* — Loza & Loza, LLP (57) ABSTRACT

Radio channel configuration is described for an access point using a multiprotocol-border gateway protocol (MP-BGP) message. In an example a report is received in a MP-BGP message from each of a plurality of APs at an AP manager. Each report includes a channel quality indicator of other APs as measured by the AP that sent the respective report. The reports are deparsed and aggregated. A transmit power adjustment is determined for a selected AP based on the aggregated reports at the AP manager and a transmit power adjustment command is sent to the selected AP.

20 Claims, 8 Drawing Sheets

(56) References Cited

U.S. PATENT DOCUMENTS

| | | | |
|---|---|---|---|
| 8,934,026 B2 * | 1/2015 | Tian | H04N 21/6547 348/222.1 |
| 8,947,493 B2 * | 2/2015 | Lian | H04N 7/15 348/14.08 |
| 9,055,001 B2 * | 6/2015 | Ould-Brahim | H04L 45/66 |
| 9,082,297 B2 * | 7/2015 | Alexander | G08C 23/04 |
| 9,204,096 B2 * | 12/2015 | Baldino | H04N 21/4223 |
| 9,258,762 B2 * | 2/2016 | Bosch | H04L 12/4641 |
| 9,338,394 B2 * | 5/2016 | Li | H04N 21/439 |
| 9,553,846 B2 * | 1/2017 | Gu | H04L 63/029 |
| 9,634,936 B2 * | 4/2017 | Bansal | H04L 45/741 |
| 9,681,154 B2 * | 6/2017 | Tian | H04N 19/136 |
| 9,763,094 B2 * | 9/2017 | Thelen | H04W 12/08 |
| 9,763,167 B2 * | 9/2017 | Gopal | H04W 40/246 |
| 9,838,947 B2 * | 12/2017 | Bosch | H04W 40/248 |
| 9,992,154 B2 * | 6/2018 | Bickhart | H04L 12/4641 |
| 10,097,372 B2 * | 10/2018 | Bhattacharya | H04L 45/745 |
| 10,218,627 B2 * | 2/2019 | Natu | H04L 43/0882 |
| 10,237,163 B2 * | 3/2019 | Jacob | H04L 45/04 |
| 10,412,012 B2 * | 9/2019 | Bhattacharya | H04L 41/0806 |
| 10,454,877 B2 * | 10/2019 | Fernando | H04L 41/0806 |
| 10,581,798 B2 * | 3/2020 | Meuninck | H04L 45/50 |
| 10,666,500 B2 * | 5/2020 | Singh | H04L 45/50 |
| 10,742,557 B1 * | 8/2020 | Miriyala | H04L 63/0263 |
| 10,742,690 B2 * | 8/2020 | Miriyala | H04L 63/205 |
| 10,771,380 B2 * | 9/2020 | Jonnalagadda | H04L 45/64 |
| 10,778,724 B1 * | 9/2020 | Miriyala | H04L 63/20 |
| 10,938,598 B2 * | 3/2021 | Van De Velde | H04W 76/16 |
| 11,115,375 B2 * | 9/2021 | Fernando | H04L 41/0806 |
| 11,128,560 B2 * | 9/2021 | Joshi | H04L 45/38 |
| 2007/0115962 A1 * | 5/2007 | Mammoliti | H04L 41/0869 370/389 |
| 2007/0121486 A1 * | 5/2007 | Guichard | H04L 45/22 370/216 |
| 2008/0170578 A1 * | 7/2008 | Ould-Brahim | H04L 12/4641 370/401 |
| 2010/0202312 A1 * | 8/2010 | Eswaran | H04L 45/306 370/252 |
| 2010/0208615 A1 * | 8/2010 | Soon | H04L 12/462 370/254 |
| 2012/0120957 A1 * | 5/2012 | Ould-Brahim | H04L 12/4641 370/392 |
| 2013/0201909 A1 * | 8/2013 | Bosch | H04L 45/64 370/328 |
| 2015/0082418 A1 * | 3/2015 | Gu | H04L 12/4633 726/15 |
| 2015/0195178 A1 * | 7/2015 | Bhattacharya | H04L 45/745 718/1 |
| 2016/0037434 A1 * | 2/2016 | Gopal | H04L 45/02 370/316 |
| 2017/0085488 A1 * | 3/2017 | Bhattacharya | H04L 41/0806 |
| 2017/0373973 A1 * | 12/2017 | Bickhart | H04L 45/741 |
| 2018/0006995 A1 * | 1/2018 | Bickhart | H04L 45/66 |
| 2018/0254919 A1 * | 9/2018 | Van De Velde | H04W 88/16 |
| 2018/0287990 A1 * | 10/2018 | Bickhart | H04L 12/462 |
| 2019/0132280 A1 * | 5/2019 | Meuninck | H04L 12/66 |
| 2019/0158541 A1 * | 5/2019 | Miriyala | H04L 63/0263 |
| 2019/0245779 A1 * | 8/2019 | Jonnalagadda | H04L 12/4641 |
| 2020/0310784 A1 * | 10/2020 | Krishnan | H04L 69/164 |
| 2020/0336420 A1 * | 10/2020 | Joshi | H04L 45/74 |
| 2021/0083967 A1 * | 3/2021 | Joshi | H04L 45/24 |
| 2021/0203688 A1 * | 7/2021 | Ghule | H04L 63/1466 |
| 2021/0297925 A1 * | 9/2021 | Berzin | H04L 45/20 |

* cited by examiner

| AP | SSID | CHANNEL | RSSI | SNR(DB) |
|---|---|---|---|---|
| 1 | BIZC2 | 36 | 56 | 39 |
| 1 | BIZC2 | 11 | 84 | 11 |
| 2 | BIZC2 | 36 | 74 | 21 |
| --- | | | | |
| 10 | BIZC2 | 36 | 48 | 47 |

FIG. 3

| AP | SSID | CHANNEL | TX POWER | SNR(DB) | USERS |
|---|---|---|---|---|---|
| 1 | BIZC2 | 36 | 18 | 11@2,21@3, 35@4,... | 20 |
| 1 | BIZC2 | 11 | 20 | 39@2,21@3, 32@4,... | 27 |
| 2 | BIZC2 | 36 | 19 | 40@1,23@3, 15@4,... | 5 |
| ... | | | | | |
| 10 | BIZC2 | 36 | 19 | 11@1,13@2, 37@3,... | 37 |

//ACCESS POINT RADIO CHANNEL CONFIGURATION USING MULTIPROTOCOL BORDER GATEWAY PROTOCOL

TECHNICAL FIELD

The embodiments herein relate to wireless networks, wireless clients, Wi-Fi networks, wireless access points, and controlling radio frequency parameters of wireless access points.

BACKGROUND

Modern businesses with multiple distributed locations are typically interconnected via an enterprise wide area network (WAN). The WAN can be implemented as a physical network or can be implemented in software as an overlay network on top of the physical network. Such a network may include hundreds or thousands of nodes, with some designated hub nodes acting as gateways for other nodes in the network. For example, an enterprise WAN might have an east coast hub, a central hub, and a west coast hub each with hundreds of connected locations. In such an interconnected network each location may have tens or hundreds of nodes.

Wireless clients, including employee and guest devices, can connect to the communications networks via wireless access points (APs) using Wi-Fi technologies. Wi-Fi refers to communications complying with the IEEE 802.11 suite of protocol standards created and maintained by the Institute of Electrical and Electronics Engineers (IEEE). Wi-Fi is generally considered a layer 2 protocol because it relates to direct wireless connections between wireless devices. The wireless client devices may be portable mobile devices, tablets, desktop computers, large-scale displays, Internet of Things device, and many other devices. Multiple APs may serve the same physical area with overlapping radio coverage. This allows the wireless clients to receive a clear signal throughout the physical area by connecting with different APs in different locations throughout the served area.

The APs also connect through the communications network to a controller for device management. A remote controller will have an AP control interface that allows an operator to configure the APs for optimal wireless performance. The controller may be able to assign radio frequencies, channels, transmit power, and service set identifiers (SSID), among other wireless configuration and operation parameters.

SUMMARY

Radio channel configuration is described for an access point using a multiprotocol-border gateway protocol (MP-BGP) message. In an example a report is received in a MP-BGP message from each of a plurality of APs at an AP manager. Each report includes a channel quality indicator of other APs as measured by the AP that sent the respective report. The reports are deparsed and aggregated. A transmit power adjustment is determined for a selected AP based on the aggregated reports at the AP manager and a transmit power adjustment command is sent to the selected AP.

In some embodiments, the report is piggybacked on the respective MP-BGP message. In some embodiments, the report is included in a network layer reachability field (NLRI) field of an Update Message MP-BGP message. Some embodiments include determining a channel being used by the selected AP at the AP manager and sending a channel assignment to the selected AP.

In some embodiments, the channel quality indicator is a retries report of transmission retries to client devices from the respective AP. In some embodiments, the channel quality indicator comprises a signal-to-noise ratio determined by sampling channels from other APs received at the selected AP. In some embodiments, determining a transmit power adjustment comprises adjusting a transmit power of the selected AP to obtain a signal to noise ratio of the selected AP as measured by other APs within a predetermined range. In some embodiments, the predetermined range is between 17 dB and 30 dB. In some embodiments, each of the plurality of APs have a same service set identifier. In some embodiments, the transmit power adjustment comprises reducing the transmit power of the selected AP by an amount within a range of 1-3 dB.

Some embodiments include repeating receiving a report and sending a transmit power adjustment iteratively to obtain a predetermined channel quality at the selected AP. In some embodiments, the report comprises a scan list. Some embodiments include receiving configuration data from each of the plurality of APs, the configuration data including transmit power, operating channel, and service set identifier of each of the plurality of APs. Some embodiments include requesting a report from each of the plurality of APs before receiving the report.

In another example, an AP manager configures radio channels of a plurality of APs. The AP manager includes a communications subsystem to receive a report in a multi-protocol-border gateway protocol (MP-BGP) message sent by each of a plurality of APs, each report including a channel quality indicator of other APs of the plurality of APs as measured by the respective AP that sent the respective report and a processor to deparse the reports from the respective MP-BGP messages, to aggregate the deparsed reports and to determine a transmit power adjustment for a selected AP of the plurality of APs based on the aggregated configuration data and the reports at the AP manager. The communication subsystem is further to send a transmit power adjustment command to the selected AP.

In some embodiments, the channel quality indicator comprises a signal-to-noise ratio determined by sampling channels from other APs received at the selected AP and wherein determining a transmit power adjustment comprises adjusting a transmit power of the selected AP to obtain a signal to noise ratio of the selected AP as measured by other APs within a predetermined range.

In another example, a signal-to-noise ratio (SNR) of a plurality of direct neighbor access points (APs) signals are sampled at a first AP. The samples are compiled into a report. The report is sent to an AP manager piggybacked on a MP-BGP message from the first AP to an AP manager. A transmit power adjustment command is received from the AP manager and the transmit power of the first AP is adjusted in response to the received command.

In some embodiments, piggybacking the report comprises including the report in a network layer reachability field (NLRI) field of an Update Message MP-BGP message. Some embodiments include sending configuration data to the AP manager, the configuration data including transmit power, operating channel, and channel width of the AP. In some embodiments, the transmit power adjustment command is to reduce transmit power by an amount within a range of 1-3 dB.

BRIEF DESCRIPTION OF THE FIGURES

The embodiments herein will be better understood from the following detailed description with reference to the drawings, in which.

DETAILED DESCRIPTION OF EMBODIMENTS

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein are described in the context of a Software Defined Wide Area Network (SD-WAN or SDWAN) where there is at least one designated hub node for each of the branch nodes and each hub node potentially acting as a gateway to a plurality of branch nodes. Further, branch nodes themselves may have direct access to the Internet through one or more WAN links. However, embodiments disclosed herein can be applied in non-software-defined WANs and for applications hosted within the network, e.g., within a LAN.

Figure 1:
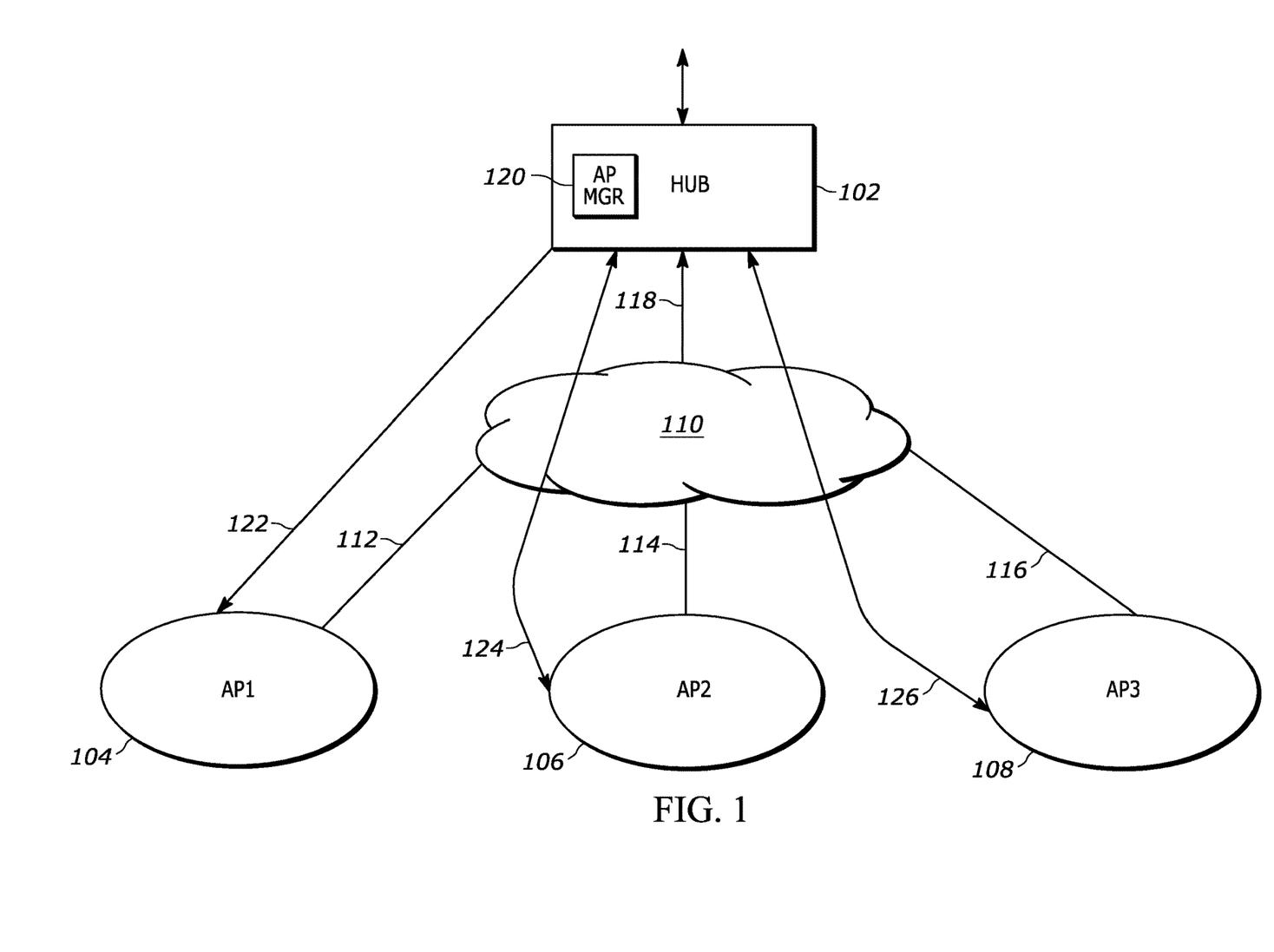
FIG. 1 is a block diagram of a network suitable for use with the present invention.

FIG. 1 is a diagram of a simplified Wi-Fi network in which a hub 102 communicates with multiple APs AP-1 104, AP-2 106 to AP-N 108 through a transport domain 110 which may include a LAN or WAN which may be physical or virtualized. Data traffic paths 112, 114, 116 connect between the APs 104, 106, 108 and the transport domain 110 which connects to the hub 102 through another data traffic path 118. Data communications may all be routed through the hub 102 or through the transport domain to other network nodes (not shown). Control connections 122, 124, 126 connect each AP 104, 106, 108 to the hub 102. In some embodiments, the control connection is through a virtual LAN tunnel (VxLAN tunneling).

Using the control connections 122, 124, 126 each AP 104, 106, 108 is able to feed configuration and status data to the AP manager 120 of the hub 102. The hub 102 includes an AP manager 120 that may then tune the configurable settings of each AP 104, 106, 108 using this configuration and status data.

Figure 2:
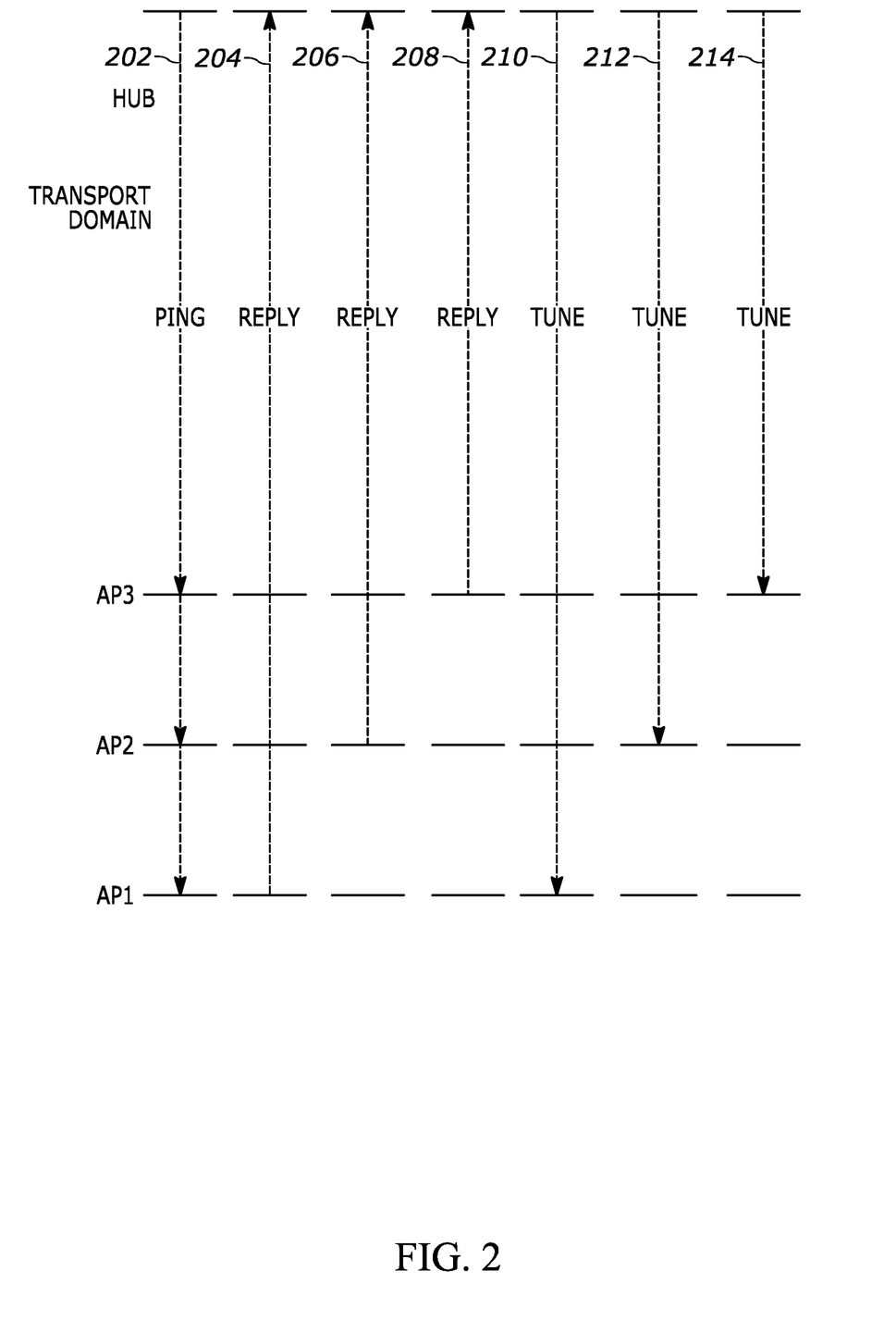
FIG. 2 is a signaling diagram of communications between APs and an AP manager according to embodiments of the present invention.

FIG. 2 is a signaling diagram of communications through the control connections 122, 124, 126 between the AP manager 120 of the hub 102 and the APs 104, 106, 108 through the transport domain. In an example process, the first signal is a ping 202 from the AP manager 120 of the hub 102 to all of the APs. These may be all or some of the APs of a system, all of some of the APs in a particular physical area, all or some of the APs that use a same SSID, or any other suitable grouping of APs. An AP manager 120 of the hub 102 may ping every AP to which it is connected for control purposes or only some of the APs. The ping may be sent to each AP individually or broadcast to multiple APs at the same time. While the request message from the AP manager is referred to herein as a ping, it is not a Packet Internet Groper or any other tradition type of network ping packet. The ping 202 may be used to function as a ping in that it provokes a response from the APs that receive it, but the purpose is not merely to detect presence but to receive the particular information discussed below. In some embodiments, the ping is the same message to each AP and includes an identification of the hub, the requested information and, optionally, an assigned time for a reply by the respective AP. In some embodiments, the AP manager 120 of the hub 102 does not send a ping signal. Instead the APs send a reply signal on a timer, for example at particular times or intervals or on another basis.

A service set is a group of wireless network devices which are identified by the same service set identifier (SSID) and multiple Wi-Fi APs can provide network access within a service set. In an active-active deployment, two Wi-Fi access points use the same SSID and can both provide network access within the service set. When two access points are deployed near one another, one access point may be the active or preferred access point while the other access point is a redundant or backup device. The deployment being active-active, both access points may be broadcasting Wi-Fi beacons having the same SSID. As such, a wireless client connecting to the service set may connect to either access point. The wireless client does not know which Wi-Fi beacons are from the preferred access point and which are from the redundant access point.

The APs each respond to the ping 202 with unique information each in a unique reply signal 204, 206, 208. In this example, there are three APs and each one sends a reply signal. The AP manager 120 of the hub 102 analyzes the data and sends a tuning signal 210, 212, 214 to the APs. The tuning signals may be different for each AP so that each AP modifies its parameters differently from other APs. In some instances, one or more of the APs may receive the same tuning signal and make the same parameter modification.

The reply signals 204, 206, 208 may include configuration information and channel quality information. In some embodiments, the reply signal may also include traffic statistics to indicate the amounts and timing of data communication and, optionally, identifiers of the client devices that generated the traffic. This information may be sent together or in separate replies. In some embodiments, the AP manager 120 of the hub 102 controls the configuration of the AP and so the AP manager 120 does not require any configuration information from the AP. In some embodiments, all of the traffic passes through the hub 102 and so the AP manager 120 does not require any traffic information. The configuration information may include channel assignments, transmit power, SSID, an identifier of the AP, and any other suitable configuration information. An AP may operate using multiple radios with different channels and with multiple SSIDs.

The channel quality information may include indicators any of a variety of different measurements of channels by the respective AP. One indicator is the signal-to-noise ratio (SNR) of a signal from another AP as received at the AP making the reply. Other channel quality measurements may be used as indicators for example signal-to-interference and noise ratio (SINR), signal strength, bit error rate (BER), retransmission rates, etc. In some embodiments, the AP making the reply measures the SNR from each other AP and compiles the measurements into a list of channel quality indicators that it then sends as the reply signal 204, 206, 208 to the AP manager 120. An AP may limit the measurements to those signals that it receives with a signal strength that exceeds a predetermined threshold signal strength. In some embodiments the APs send an interference measurement to the AP manager 120, for example a report of the AP's retransmission rate may give an indication of the number of retries used to send data over the channel by the AP or by clients in communication with the AP.

Having received the measurements in the reply signals 204, 206, 208 from the APs, the AP manager 120 determines whether and how to adjust the radio parameters of the APs. The AP manager 120 then sends the determined adjustments as commands in a tuning signal 210, 212, 214 to each of the APs. In some embodiments, a tuning signal is sent only to APs for which a change is commanded. In some embodiments, the tuning signal contains an indication of a transmit power adjustment. In some embodiments, the tuning signal includes adjustments to other radio parameters, for example channel assignments and an SSID. Active and standby parameters may also be included.

A periodic transmit power adjustment may be applied to the APs to improve overall data performance. Non-Wi-Fi interference may be detected by the APs and the Wi-Fi environment monitored. The setting for each radio's transmit power at each AP is then tuned based on the environmental factors that the APs detect. As described in more detail below, each AP samples the SNR of neighbor APs that reside in the same network. All of the radios on an AP may perform the sampling. The SNR readings may be compiled into reports which are sent to the AP manager of the hub for processing. The AP manager aggregates reports from each AP regarding neighbor APs. Using the aggregated data, the AP manager identifies each AP's direct neighbors (a direct neighbor AP being a neighbor AP that a client might directly roam to) and how much each AP should adjust its radio transmit power so that the coverage in each cell is optimized. Once these calculations are complete, the AP manager instructs each AP to decrease or increase its transit power at particular radios to reach an optimal power level. The transmit power adjustment process may be performed periodically, for example at timing intervals of 5, 10, or 20 minutes, for each AP in the network on both 2.4 GHz and 5 GHz radios, among others.

Figure 3:
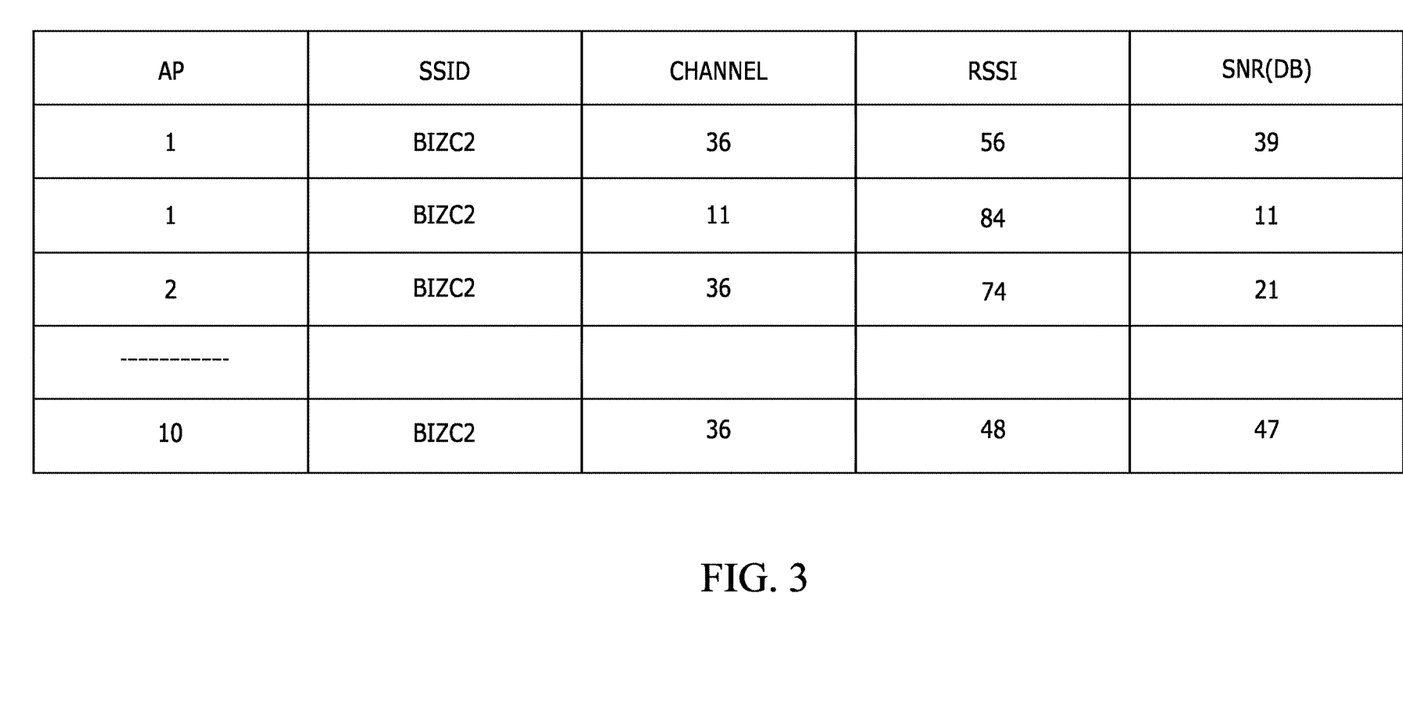
FIG. 3 is a sample of a partial table of scan data compiled by an AP according to embodiments of the present invention.

FIG. 3 is a sample partial table of AP scan data. The table has a row for each AP within range. In this example there are 10 APs other than the measuring AP that generated the table. For each AP, there is a report of each channel that the measuring AP can receive. In the table, the measuring AP, for example, APS, received signals on two channels from AP1 and only one channel for AP2 and AP10. The measuring AP measured received signal strength and signal-to-noise for each measured signal. This is then provided as RSSI (Received Signal Strength Indicator) and SNR to the table. The results in the table form the content of the reply signal 208 from the AP to the AP manager 120 of the hub 102. There may be more or fewer measurements for each AP and there may be multiple measurements included in the reply.

Figure 4:
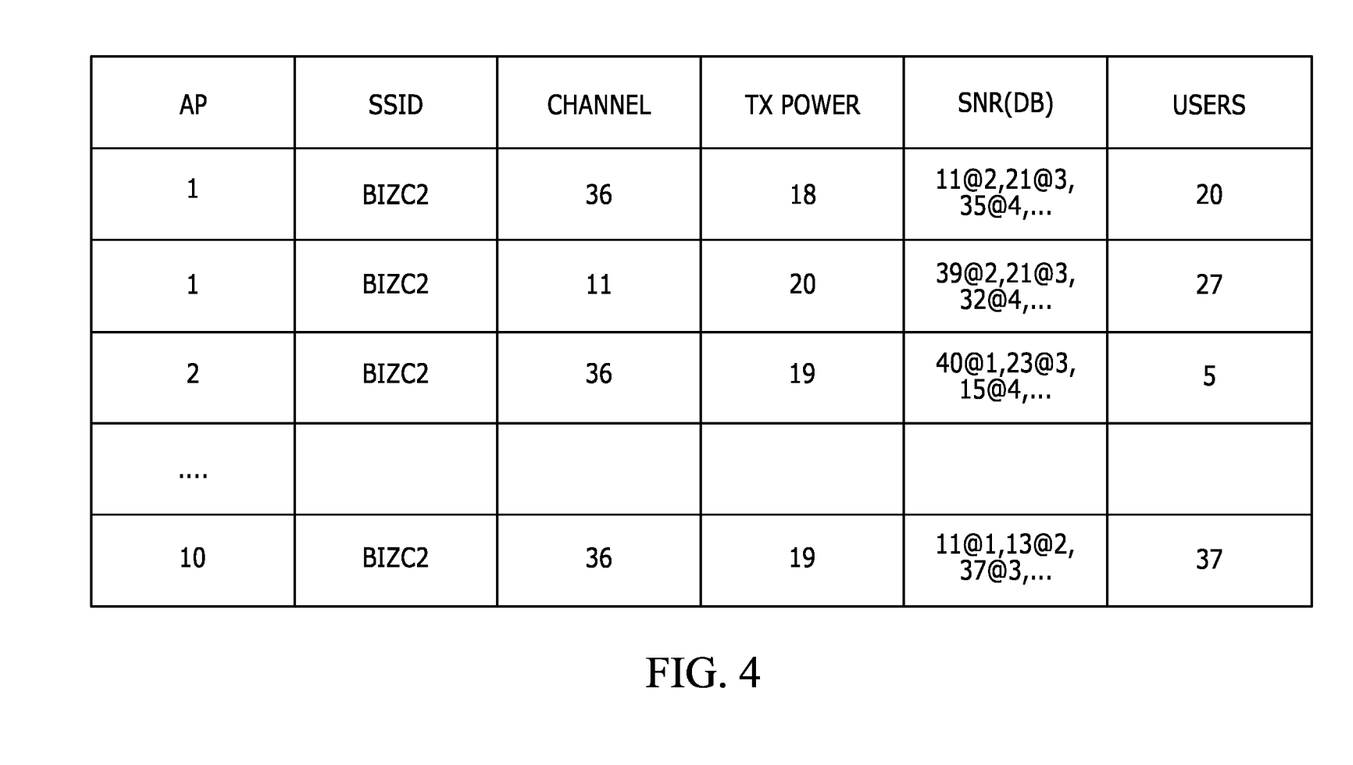
FIG. 4 is a sample of a partial table of aggregated scan data of an AP manager from multiple AP reports according to embodiments of the present invention.

FIG. 4 is a sample partial table of aggregated scan data received from the APs at the AP manager. This table includes the measurements provided by the APs in the SNR column. The SNR, or other channel quality indicator, from each AP is presented in a single column, however, the table may alternatively have multiple columns. The channel quality indicators are aggregated together in the table together with the transmit power (TX Power) setting for each AP and the number of client devices (users) served by the AP. The transmit power may be indicated on a scale that is related to but not the same as the actual transmit power. Similarly, the number of users may be an average number of simultaneous users, active sessions, or any other useful indication of the traffic carried by the respective AP.

The table of FIG. 4 is provided only as a partial indication of some of the information that may be useful to an AP manager. Using this information and other information, the AP manager is able to adjust the transmit power of each AP to obtain optimum coverage and data transmission with minimal transmit power and interference from nearby APs. In some embodiments, the AP manager considers the highest and the lowest SNR value and adjusts the transmit power up to make the lowest SNR value higher or adjusts the transmit power down to make the highest SNR value lower. The tuning command sent by the AP manager may include detailed information regarding channels, SSID, bandwidth and other parameters for wireless communications. Alternatively, it may simply indicate a transmit power change for a particular radio of the AP. The power change may simply indicate to increase or decrease the transmit power by some number of steps e.g. from one to four or one to eight steps. Alternatively, it may provide a transmit power index on a standardized scale, e.g. an index number from zero to 31.

Figure 5:
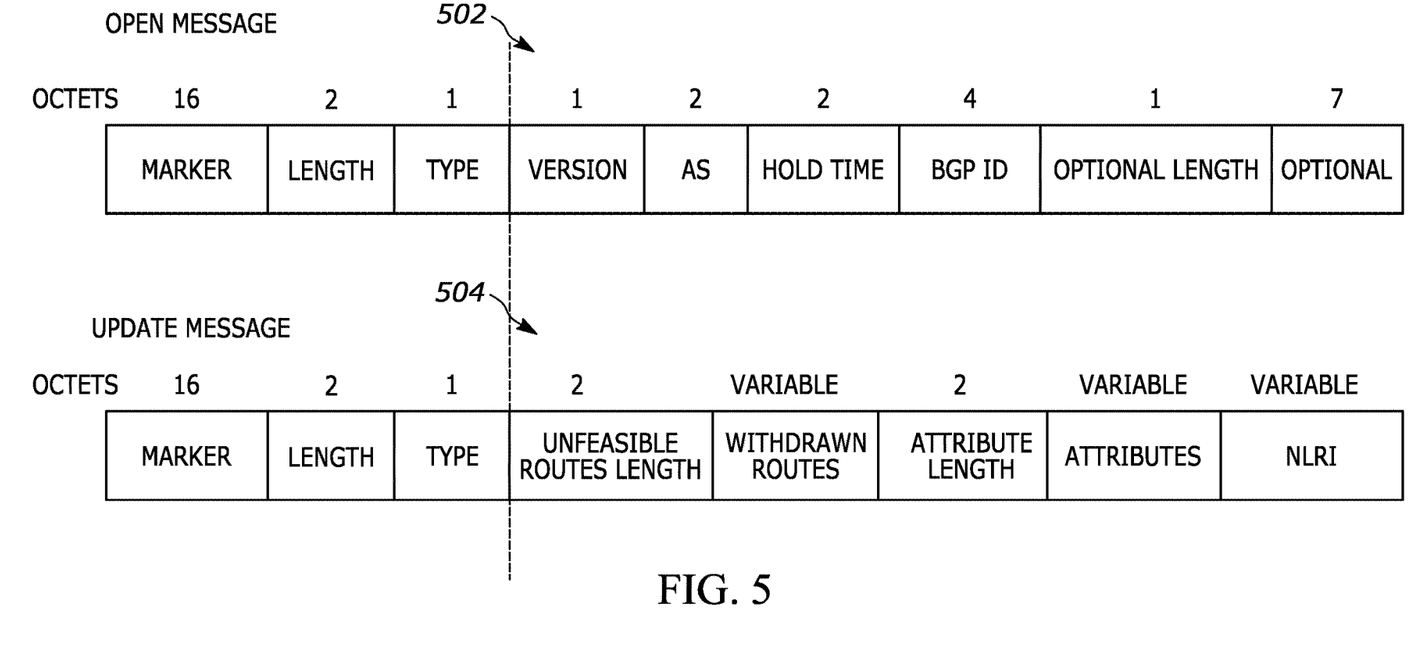
FIG. 5 is a diagram of MP-BGP Open and Update Messages suitable for use with the present invention.

In some embodiments, the APs communicate through the transport domain using MP-BGP (Multiprotocol-Border Gateway Protocol). FIG. 5 shows formats for two different MP-BGP messages that may be used by the APs and the AP manager 120. In MP-BGP, an Open Message 502 is used to establish a connection between two nodes for example between the AP manager 120 and an AP. The Open Message 502 includes protocol versions, and identifier information, etc. As shown, this is implemented with a marker field, a length field, and a type field. This is followed by a protocol version, AS hold time, BGP identifier and an optional field.

Having established a session, the two nodes are referred to as BGP neighbors and exchange routing information using an Update Message 504. The Update Message advertises, updates, and withdraws routes. As shown, it may contain a marker, length, and type just like the Open Message 502, followed by unfeasible routes length, withdrawn routes, attribute length, attributes, and the Network Layer Reachability Information (NLRI) field. These fields contain, among other things, prefixes to indicate path attributes (i.e. prefixes to be added), withdrawn routes (i.e. prefixes to be removed). Prefixes in the context of MP-BGP refer to IPv4 address prefixes or IPv6 address prefixes for the routes advertised in the attributes field.

The NLRI has a variable number of octets and therefore allows for reports to be sent instead of prefixes from an AP to the AP manager of the hub. The NLRI field may also allow for tuning information to be sent from the AP manager of the hub to an AP. The NLRI is defined as having a length and a prefix. The prefix provides a network address for the subnet at which the sending node may be reached. In embodiments described herein the NLRI is instead used to send channel quality indicators, as shown for example in FIG. 3, to the AP manager and to send tuning commands to an AP. The length portion may be used to indicate the length of the prefix portion while the prefix portion may be used for the channel quality indicator from an AP or tuning commands from the AP manager.

Figure 6:
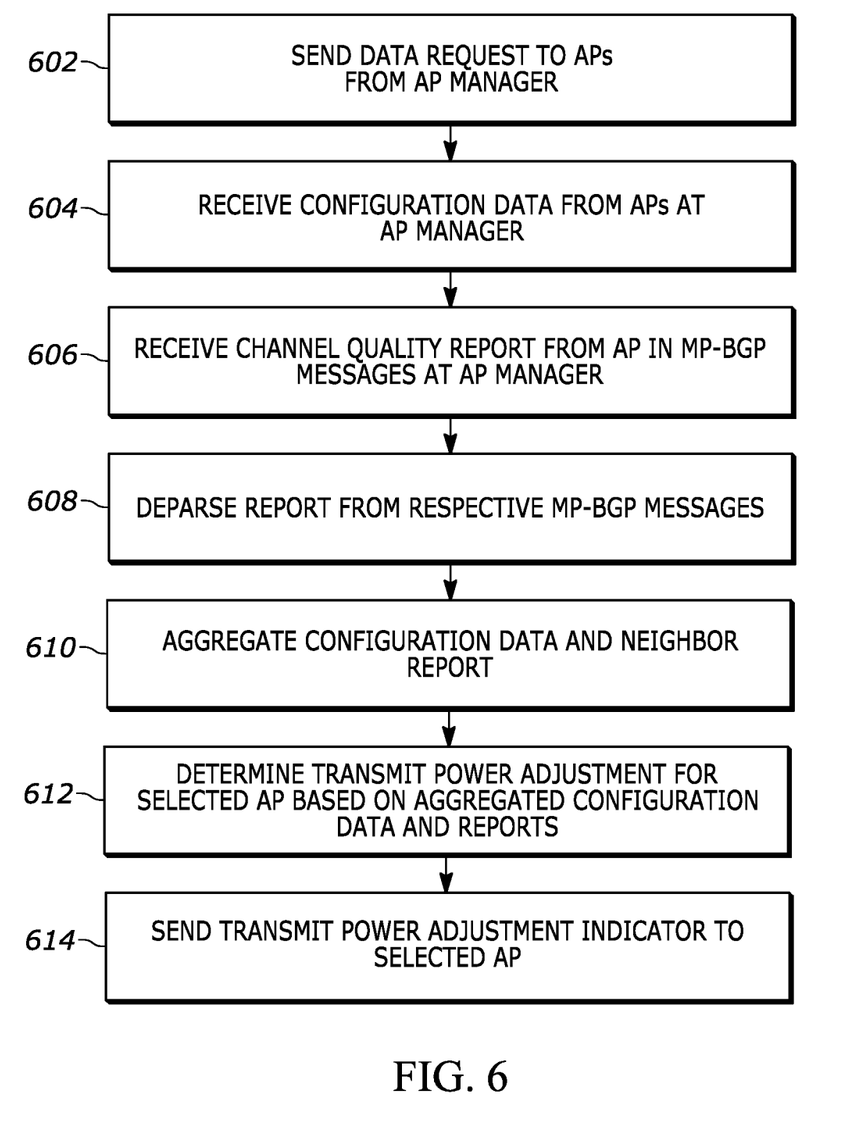
FIG. 6 is a process flow diagram of tuning transmit power of an AP according to embodiments of the present invention.

FIG. 6 is a process flow diagram for tuning transmit power at an AP manager 120 of the hub 102. Consider a scenario in which two or more APs provide at least partially overlapping coverage. Both AP's are operating in the same channel, are broadcasting the same SSID, and are configured with the transmit power of a radio set to Max txpower. In this case both AP's feed the data (txpower, channel and SSID info) to the AP manager using MP-BGP. The AP manager is informed through the MP-BGP Update Notification that two AP's are operating in the same channel, broadcasting the same SSID, and transmitting with high power. The AP manager, using this information, may take many different actions. In one example, the AP manager tunes the txpower setting for one of the APs to Min txpower to reduce the interference in the network.

In the process of FIG. 6, at 602, an AP manager optionally sends a request to one or more of the APs to which it is connected. The request may be in the form of the ping described above. The request may be sent within an NLRI field of an Update Message or in any of a variety of other ways. In some embodiments the request is broadcast to multiple APs. In some embodiments the request is to a particular AP. The request may state the nature of the requested information. In some embodiments, there is no request and the APs are configured to send information based on a schedule, a timer, or a trigger.

At 604, configuration data is optionally received from the one or more APs at the AP manager. This configuration information may include channels, bandwidth, neighbor APs, transmit power, SSID, radio in use, traffic conditions and any other desired information. Alternatively, the AP manager controls and tracks the configuration of each AP without any need of receiving configuration reports.

At 606, a channel quality report is received from one or more of the APs at the AP manager of the hub. The channel quality report is generated by each AP that sends such a report by scanning transmissions from any of the other APs that are within range. APs within range may be denoted as neighbor APs. The report may be in any suitable configuration that is aggregated for transmission to the AP manager including as a scan list. The AP receives signals from each other AP and measures the quality of each signal. Quality may be indicated by any one or more of a variety of different measures as described above, for example SNR, SINR, BER, RSSI or other measures. The measurements are compiled by the measuring AP and sent to the AP manager in one or more MP-BGP messages, for example in the NLRI of an Update Message.

At 608, the AP manager receives the channel quality report and deparses it from the message. All of the channel quality reports may be deparsed. This allows the channel quality measurements from different APs to be compared. At 610, each received report is aggregated with the other reports from the other APs. At 612, the AP manager determines transmit power adjustments for one or more of the APs. This may be done using the aggregated reports and the configuration information. The determination may be made by comparing the SNR of a particular AP as measured at different neighbor APs. In some embodiments, for each AP that is using a same SSID, there is a minimum SNR and a maximum SNR. If the SNR at any one neighbor AP is too high, in that it exceeds an upper threshold, then the transmit power is reduced. If the SNR at any one neighbor AP is too low, in that it is below a lower threshold, then the transmit power is increased. The AP manager, in this way, makes adjustments to keep the received SNR at each other AP within a range between the upper and the lower thresholds. The thresholds may be selected to suit different locations, radio signal propagation environments, and other parameters. In one embodiment, the upper threshold is 30 dB and the lower threshold is 17 dB. Such a selection is for a predetermined range of 17-30 dB.

At 614, the AP manager sends a transmit power adjustment to one or more of the APs based on the determinations. The transmit power may be in the form of an increase or reduction by a particular amount between e.g. a range of 1-3 dB. Alternatively, the transmit power may be set to a particular value. In some embodiments, the transmit power is adjusted iteratively after each report until the received SNR is within a predefined or configured range at each other AP. The process may be repeated to obtain and maintain an optimum transmit power level at each AP.

Figure 7:
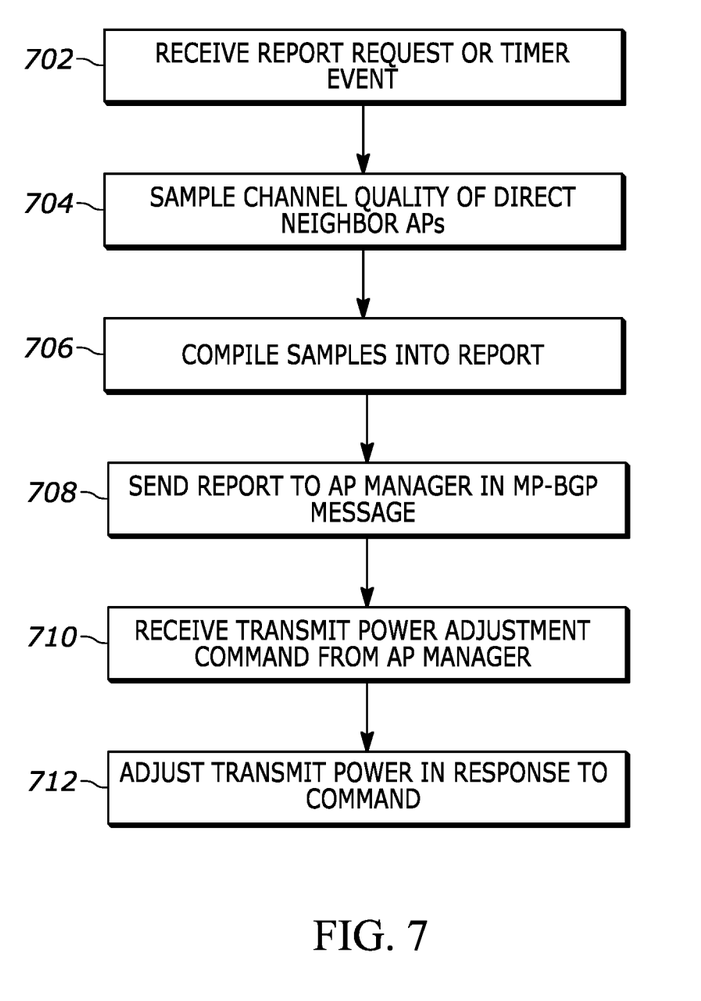
FIG. 7 is a process flow diagram of adjusting transmit power by an AP according to embodiments of the present invention.

FIG. 7 is a process flow diagram for adjusting transmit power by an AP or a plurality of APs. At 702, the AP receives a report request from an AP manager or from some other event for example a timer or trigger. At 704, the AP prepares the requested report by first sampling a channel quality of any neighbor APs, for example, any APs from which a signal can be received. In some embodiments, only APs with a same SSID are sampled. The AP may sample signals on different channels and frequencies or bandwidths from those of the measuring AP. At 706, the samples are compiled into a report of a channel quality indicator for each received signal. As mentioned above, the indicator may be SNR but other indicators may be measured and used in the report.

At 708, the AP sends the report to the requesting or connected AP manager using, for example the NLRI field of an MP-BGP Update Message. At 710, the AP may receive a transmit power adjustment command from the AP manager. In some circumstances there is no transmit power adjustment. At 712, the AP adjusts its transmit power in response to the command. The process may be repeated in order to optimize transmit power for all of the affected APs.

Figure 8:
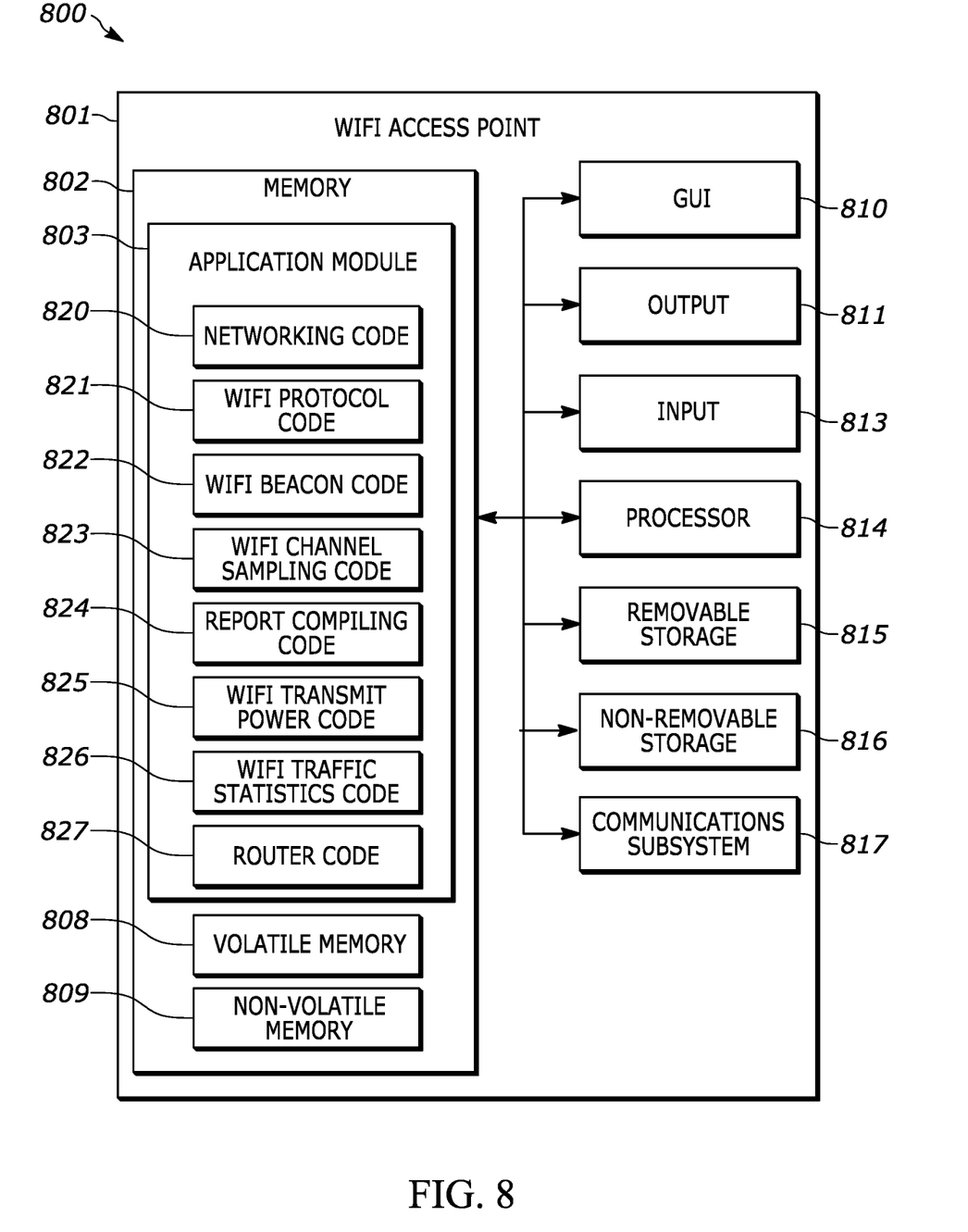
FIG. 8 is a diagram of an AP or AP manager according to embodiments of the present invention.

FIG. 8 is a high-level block diagram 800 of an AP 801 in which aspects of sending reports and adjusting power may be implemented. The hub 102 and AP manager 120 may have the same or a similar structure. In some embodiments, the hub supports only wired communications instead of wired and wireless, depending on the implementation. The hub may include the AP manager within the application module 803. A computing device in the form of the AP 801, configured to interface with controllers, peripheral devices, and other elements disclosed herein, may include one or more processing units 814, memory 802, removable storage 815, and non-removable storage 816. Memory 802 may include volatile memory 808 and non-volatile memory 809. The AP 801 may include or have access to a computing environment that includes a variety of transitory and non-transitory computer-readable media such as volatile memory 808, non-volatile memory 809, removable storage 815 and non-removable storage 816. Computer storage includes, for example, random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage, or other magnetic storage devices, or any other medium capable of storing computer-readable instructions as well as data.

The AP 801 may include, or have access to, a computing environment that includes input 813, output 811, and a communications subsystem 817. The AP 801 may operate in a networked environment using a communications subsystem 817 to connect to one or more remote computers, remote sensors and/or controllers, detection devices, hand-held devices, multi-function devices (MFDs), speakers, mobile devices, tablet devices, mobile phones, smartphone, or other such devices. The remote computer may also be a personal computer (PC), server, router, network PC, RFID enabled device, a peer device or other common network node, or the like. The communication connection may include a LAN, a WAN, Bluetooth connection, or other networks.

Output 811 can be provided as an interface to a computer monitor or flat panel display but may include any output device. Output 811 and/or input 813 may include a data collection apparatus associated with AP 801. In addition, input 813, which can include an interface to a computer keyboard and/or pointing device such as a computer mouse, computer track pad, touch screen, or the like, allows a user to provide inputs to AP 801. A user interface can be provided using output 811 and input 813. Output 811 may include a GUI (graphical user interface) 810. A GUI can be responsive of user inputs entered through input 813 and typically displays images and data via GUI 810. Output 811 can be provided as a web page served via the communications subsystem 817 to a device for display to a user and for receiving inputs from the user. The web page can include GUI 810.

Note that the term "GUI" generally refers to a type of environment that represents programs, files, options, and so forth by means of graphically displayed icons, menus, and dialog boxes on a computer monitor screen or smart phone screen. A user can interact with the GUI to select and activate such options by directly touching the screen and/or pointing and clicking with a user input device such as, for example, a pointing device such as a mouse, and/or with a keyboard. A particular item can function in the same manner to the user in all applications because the GUI provides standard software routines (e.g., the application module 803 can include program code in executable instructions, including such software routines) to handle these elements and report the user's actions. The GUI can be a web interface output via the communications subsystem 817 to a device that displays the GUI, receives inputs, and provides the inputs to the AP 801 via the communications subsystem 817.

Computer-readable instructions, for example, program code in application module 803, can include or be representative of software routines, software subroutines, software objects, etc. described herein, are stored on a computer-readable medium and are executable by the processor device (also called a processing unit) 814 of AP 801. The application module 803 can include computer code such as networking code 820, Wi-Fi protocol code 821, Wi-Fi beacon code 822, Wi-Fi channel sampling code 823, report compiling code 824, Wi-Fi transmit power code 825, Wi-Fi traffic statistics code 826, and router code 827. A hard drive, CD-ROM, RAM, Flash Memory, and a USB (Universal Serial Bus) drive are just some examples of articles including a computer-readable medium.

In the case of the hub and AP manager, the report compiling code 824 may be configured to deparse and aggregate the report received from APs through the communication subsystem 817. The Wi-Fi transmit power code 826 may be configured to determine transmit power adjustments for the connected APs. The Wi-Fi traffic statistics code 826 may be configured to compile traffic statistics for all of the connected APs and generate insights for use in determining transmit power adjustments, among other purposes.

The embodiments disclosed herein can be implemented through at least one software program running on at least one hardware device and performing network management functions to control the network elements. The network elements shown in FIG. 8 include blocks which can be at least one of a hardware device, or a combination of a hardware device and a software module. It is understood that the scope of the protection for systems and methods disclosed herein is extended to such a program and in addition to a computer readable means having a message therein, such computer readable storage means contain program code means for implementation of one or more steps of the method, when the program runs on a server or mobile device or any suitable programmable device.

In an embodiment, the functionality described above is performed by a computer device that executes computer readable instructions (software). Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

While the above-described techniques are described in a general context, those skilled in the art will recognize that the above-described techniques may be implemented in software, hardware, firmware, or any combination thereof. The above-described embodiments of the invention may also be implemented, for example, by operating a computer system to execute a sequence of machine-readable instructions. The instructions may reside in various types of computer readable media. In this respect, another aspect of the present invention concerns a programmed product, comprising computer readable media tangibly embodying a program of machine-readable instructions executable by a digital data processor to perform the method in accordance with an embodiment of the present invention. The computer readable media may comprise, for example, RAM (not shown) contained within the computer. Alternatively, the instructions may be contained in another computer readable media such as a magnetic data storage diskette and directly or indirectly accessed by a computer system. Whether contained in the computer system or elsewhere, the instructions may be stored on a variety of machine readable storage media, such as a DASD storage (e.g. a conventional "hard drive" or a RAID array), magnetic tape, electronic read-only memory, an optical storage device (e.g., CD ROM, WORM, DVD, digital optical tape), paper "punch" cards. In an illustrative embodiment of the invention, the machine-readable instructions may comprise lines of compiled C, C++, or similar language code commonly used by those skilled in the programming for this type of application arts.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the claims as described herein.

What is claimed is:

1. A method comprising:
   receiving a report in a multiprotocol-border gateway protocol (MP-BGP) message sent by each of a plurality of APs at an AP manager, each report including a channel quality indicator of other APs of the plurality of APs as measured by the respective AP that sent the respective report;
   deparsing the reports from the respective MP-BGP messages;
   aggregating the deparsed reports;
   determining a transmit power adjustment for a selected AP of the plurality of APs based on the aggregated configuration data and the reports at the AP manager; and
   sending a transmit power adjustment command to the selected AP.

2. The method of claim 1, wherein the report is piggybacked on the respective MP-BGP message.

3. The method of claim 2, wherein the report is included in a network layer reachability field (NLRI) field of an Update Message MP-BGP message.

4. The method of claim 1, further comprising:
   determining a channel being used by the selected AP at the AP manager; and
   sending a channel assignment to the selected AP.

5. The method of claim 1, wherein the channel quality indicator is a retries report of transmission retries to client devices from the respective AP.

6. The method of claim 1, wherein the channel quality indicator comprises a signal-to-noise ratio determined by sampling channels from other APs received at the selected AP.

7. The method of claim 6, wherein determining the transmit power adjustment comprises adjusting a transmit power of the selected AP to obtain a signal to noise ratio of the selected AP as measured by other APs within a predetermined range.

8. The method of claim 7, wherein the predetermined range is between 17 dB and 30 dB.

9. The method of claim 1, wherein each of the plurality of APs have a same service set identifier.

10. The method of claim 1, wherein the transmit power adjustment comprises reducing the transmit power of the selected AP by an amount within a range of 1-3 dB.

11. The method of claim 1, further comprising repeating receiving the report and sending the transmit power adjustment iteratively to obtain a predetermined channel quality at the selected AP.

12. The method of claim 1, wherein the report comprises a scan list.

13. The method of claim 1, further comprising receiving configuration data from each of the plurality of APs, the configuration data including transmit power, operating channel, and service set identifier of each of the plurality of APs.

14. The method of claim 1, further comprising requesting a report from each of the plurality of APs before receiving the report.

15. An AP (Access Point) manager to configure radio channels of a plurality of APs, the AP manager comprising:
   a communications subsystem to receive a report in a multiprotocol-border gateway protocol (MP-BGP) message sent by each of a plurality of APs, each report including a channel quality indicator of other APs of the plurality of APs as measured by the respective AP that sent the respective report; and
   a processor to deparse the reports from the respective MP-BGP messages, to aggregate the deparsed reports and to determine a transmit power adjustment for a selected AP of the plurality of APs based on the aggregated configuration data and the reports at the AP manager,
   wherein the communication subsystem is further to send a transmit power adjustment command to the selected AP.

16. The AP manager of claim 15, wherein the channel quality indicator comprises a signal-to-noise ratio determined by sampling channels from other APs received at the selected AP and wherein determining a transmit power adjustment comprises adjusting a transmit power of the selected AP to obtain a signal to noise ratio of the selected AP as measured by other APs within a predetermined range.

17. A method comprising:
   sampling a signal-to-noise ratio (SNR) of a plurality of direct neighbor access points (APs) signals at a first AP;
   compiling the samples into a report;
   sending the report to an AP manager piggybacked on a multiprotocol-border gateway protocol (MP-BGP) message from the first AP to an AP manager;
   receiving a transmit power adjustment command from the AP manager; and
   adjusting the transmit power of the first AP in response to the received command.

18. The method of claim 17, wherein piggybacking the report comprises including the report in a network layer reachability field (NLRI) field of an Update Message MP-BGP message.

19. The method of claim 17, further comprising sending configuration data to the AP manager, the configuration data including transmit power, operating channel, and channel width of the AP.

20. The method of claim 17, wherein the transmit power adjustment command is to reduce transmit power by an amount within a range of 1-3 dB.

* * * * *